J. A. McNiel,
Potato Masher,

Nº 50,724. Patented Oct. 31, 1865.

Witnesses: Inventor:

United States Patent Office.

JOHN A. McNIEL, OF GRAND RAPIDS, MICHIGAN.

MEAT-POUNDER AND POTATO-MASHER.

Specification forming part of Letters Patent No. 50,724, dated October 31, 1865.

*To all whom it may concern:*

Be it known that I, JOHN A. McNIEL, of Grand Rapids, in the county of Kent and State of Michigan, have invented a new and improved implement for pounding meat, mashing potatoes, and working butter and stamping the same; and I do hereby declare that the following is a full, clear, and exact description thereof, which will enable others skilled in the art to make and use the same, reference being had to the accompanying drawings, forming part of this specification, in which—

Figure 1:
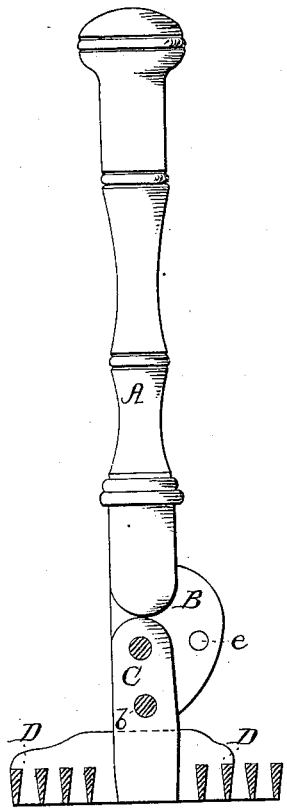
Figure 2:
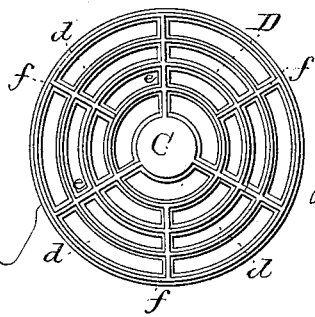

Figure 1 is a side view of the implement, with the disk partly in section. Fig. 2 is a bottom view of the disk.

Similar letters of reference indicate like parts.

My invention consists in a novel construction of an instrument for pounding meat, mashing potatoes, working butter and stamping the same, constructed and adapted for use substantially as hereinafter described.

To enable others to understand my invention, I will proceed to describe it.

A represents the handle of the instrument. On the lower end of this handle there is secured a segment, B, the handle fitting into a socket connected to this segment. To this segment there is pivoted the stem C, which carries the disk D. The manner of pivoting this disk is shown clearly at *a*, Fig. 1. The stem C is secured in either a vertical position by bolting it at the point designated by *b* in the said Fig. 1, or in a position at right angles to the handle by bolting it at the point *c* on the said plate *b*.

The disk D consists of a series of circular straps or pieces of metal, *d d*, placed concentrically with each other, and secured to the stem C and together by arms *e e* and cross-pieces *f f*, as shown clearly in Fig. 1.

When using this instrument for mashing potatoes, working butter, and stamping the same, it is intended that the disk shall be in a vertical line with the handle, as shown in Fig. 1; but when using it as a meat-pounder the disk is to be turned round and bolted at *c*. This latter position renders the operation of pounding the meat more easy.

My invention produces a convenient instrument, which can be used for several purposes, and one that can be easily cleaned after use, and one that is not clumsy or likely to get out of order by continued use.

What I claim as new, and desire to secure by Letters Patent, is—

An instrument for pounding meat, mashing potatoes, working butter, &c., constructed substantially as herein shown and described.

JOHN A. McNIEL.

Witnesses:
  THADDEUS FOOTE,
  EBEN SMITH, Jr.